United States Patent
Bible et al.

(10) Patent No.: US 6,588,851 B1
(45) Date of Patent: Jul. 8, 2003

(54) CLAMP FOR RETAINING BRISTLE BUNDLES OF VARIOUS SIZES

(76) Inventors: Kenan Bible, 1065 Flat Top Way, Del Rio, TN (US) 37727; James Collins, 7575 Lonesome Pine Trail, Greeneville, TN (US) 37745; Lloyd Etter, 536 Windridge La., Morristown, TN (US) 37814

( * ) Notice: Subject to any disclaimer, the term of this patent is extended or adjusted under 35 U.S.C. 154(b) by 0 days.

(21) Appl. No.: 09/579,990

(22) Filed: May 26, 2000

(51) Int. Cl.$^7$ .............................. A46D 3/00; A46D 3/08
(52) U.S. Cl. .................................. 300/2; 300/7; 300/10
(58) Field of Search ............................ 300/2, 4, 7, 10

(56) References Cited

U.S. PATENT DOCUMENTS 5,431,484 A * 7/1995 Zahoransky
5,622,411 A 4/1997 Weihrauch
5,823,633 A 10/1998 Weihrauch

FOREIGN PATENT DOCUMENTS

FR 2 032 597 11/1970
WO WO 99 22623 5/1999

OTHER PUBLICATIONS

International Search Report issued for corresponding PCT application PCT/US01/16935.

* cited by examiner

Primary Examiner—Randall E. Chin
(74) Attorney, Agent, or Firm—Valerie B. Rosen; Choate, Hall & Stewart

(57) ABSTRACT

A method of exerting a uniform force on bristle bundles in a clamp. Holes in a locking plate in a clamp are adjusted such that when the clamp is engaged, a specific force is exerted on the bristle bundles. The adjustment allows the holes to be displaced by different amounts for a given displacement of the locking plate.

11 Claims, 6 Drawing Sheets

CLAMP FOR RETAINING BRISTLE BUNDLES OF VARIOUS SIZES

FIELD OF THE INVENTION

This invention pertains to a magazine for carrying bristles through a brush-making apparatus, and, more specifically, to a magazine which retains all of the bristles with the same force.

BACKGROUND OF THE INVENTION

The variety of brands, designs, and styles of toothbrushes available in the United States today is truly staggering. Brushes are available in sizes and styles appropriate for babies, adults, dentures, sensitive gums, and other specialized needs. As consumers become more concerned about oral hygiene, manufacturers have designed brushes whose bristles are optimized to reach and clean the irregular surfaces of the teeth. These brushes frequently have bristle bundles with a variety of different shapes and sizes.

The bristle bundles may be inserted into the brush via any of several methods. In an in-mold process, the ends of the bristle bundles are projected into a mold cavity and the handle injection molded around the ends of the bristles, encapsulating the ends of the bristles in the brush. In a fusion process, the handles are produced by injection molding, following which the bristles are inserted into holes in the head of the brush. The holes may be formed during the injection molding or created as part of the fusion process. To fuse the bristle bundles into the brush, either the ends of the bristles are heated or the head of the brush is heated, or both. The bristles are inserted into the holes, and heated material flows to encapsulate the bristles in the holes. Exemplary in-mold bristling processes are described in U.S. Pat. No. 5,143,424 and in our co-pending patent application Ser. No. 09/494,946, filed Feb. 2, 2000, now U.S. Pat. No. 6,523,907, the entire contents of both of which are incorporated herein by reference. Exemplary fusion processes are described in our co-pending patent application Ser. No. 09/465,209, filed Dec. 15, 1999, now U.S. Pat. Nos. 6,260,928, and 4,637,660, the entire contents of both of which are also incorporated herein by reference.

In either of these methods, the bristles must be processed either before or after (or both) being united with the handle. The use ends of the bristles must be polished, or end-rounded, to remove any sharp edges. The bristle bundles themselves may be profiled to vary the length of the bristles within each bristle bundle. In addition, the non-use ends of the bristle bundles are typically fused before insertion into the handle.

Until they are inserted into the handle, the bristle bundles are carried along a brush-making apparatus by a magazine. This magazine clamps the bristles to retain them during the cutting, end-rounding and injection molding or fusion steps and releases them temporarily for the profiling step. If, in an in-mold bristling process, the handle is produced using a two part injection process, then the magazine retains the first injected portion via the bristles while it is transported from the first injection mold to the second. Thus, the clamp in the magazine may have to retain the bristles against a relatively large force.

Thus, it is desirable to have a magazine that can retain the bristles with a consistent force across all bristle bundles without damage to the bristles.

SUMMARY OF THE INVENTION

In one aspect, the invention is a magazine for a plurality of bristle bundles. The magazine includes a backplate, a mold plate, and a locking plate disposed between the mold plate and the backplate. A plurality of channels extend through the backplate, mold plate, and locking plate. The channels comprise first, second, and third holes in the backplate, locking plate, and mold plate, respectively. A sliding cam action is slidably disposed within the clamping plate. When the sliding cam action is in a first position, the locking plate retains the bristle bundles in the channels; the bristle bundles are released when the sliding cam action is in a second position. The first and second holes in each channel have a cross-section the same shape and size as a cross-section of the bristle bundles which are designated to be contained in those channels. However, at least a portion of the channels have a second hole having a larger cross-sectional area than the cross-section of the bristle bundles designated to be contained therein. The plurality of second holes in the locking plate may be adapted and constructed to exert the same force on the bristle bundles in each of the channels when the sliding cam action is in the first position. The holes may include a leading side and a trailing side. The trailing side of at least a portion of the second holes of the channels are not aligned with the trailing sides of the corresponding first and third holes in each channel when the sliding cam action is in the first position. The extent of the misalignment need not be the same for all the channels and may be adjusted such that a force exerted on each of the bristle bundles when the sliding cam action is in the first position is equal. The force exerted on each of the bristle bundles when the sliding cam action is in the first position may be at least 0.5, 3, 5, 8, 12, or 18 pounds.

In another aspect, the invention is an improved magazine for transporting bristle bundles. The magazine has a backplate, a mold plate, a locking plate disposed between the mold plate and the backplate, channels traversing the magazine comprising first, second, and third holes in each of the backplate, locking plate, and mold plate, respectively, and a sliding cam action slidably disposed within the locking plate. The locking plate retains the bristle bundles in the channels when the sliding cam action is in a first position and releases them when the sliding cam action is in a second position. The improvement to the magazine comprises an adjustment to the cross-sectional area of the second holes in each of the channels such that the locking plate exerts a consistent force on the bristle bundles when the sliding cam action is in the first position.

In another aspect, the invention is a method for designing a retaining apparatus. The method comprises disposing a bristle bundle having a type in a channel in a testing apparatus having a clamp slidably disposed therein, slidably displacing the clamp to retain the bristle bundle until it exerts a pre-determined force on the bristle bundle, determining the displacement of a trailing side of the channel with respect to a fixed point on the testing apparatus when the clamp exerts the pre-determined force, repeating the steps of disposing and displacing for each additional type of bristle bundle which will be held by the retaining apparatus, and disposing channels in a clamping plate of the retaining apparatus such that, when the clamp of the retaining apparatus is displaced by a pre-determined amount, the trailing sides of the channels in which each of the different types of bristle bundles are disposed are displaced by the determined amount with respect to a point on the retaining apparatus corresponding to the fixed point on the testing apparatus. Bristle bundle type may comprise bristle bundle shape or size, bristle material, or any combination thereof. The force exerted on each of the bristle bundles by the clamp may be at least 0.5, 3, 5, 8, 12, or 18 pounds.

BRIEF DESCRIPTION OF THE DRAWING

The invention is described with reference to the several figures of the drawing, in which.

DETAILED DESCRIPTION

Figure 1A:
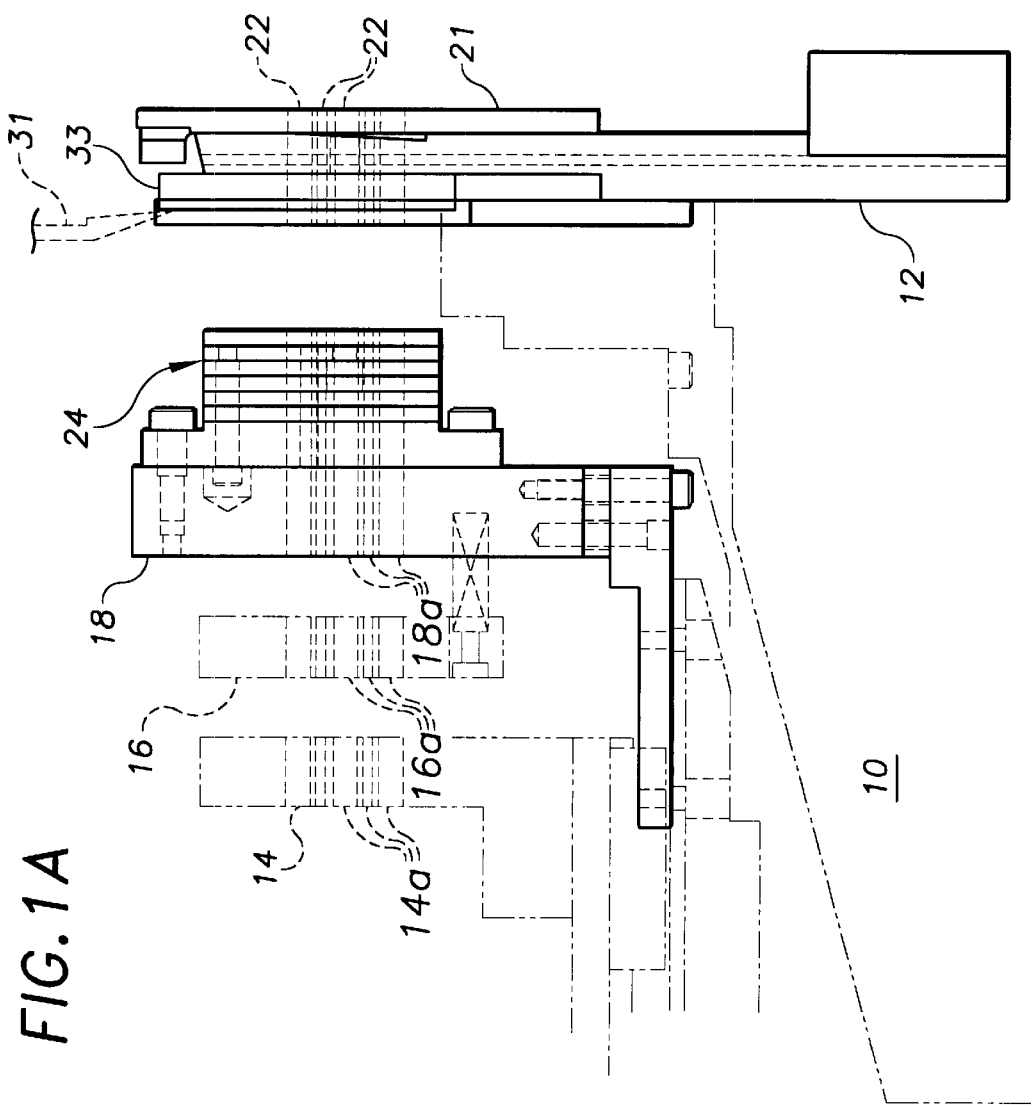
FIG. 1A is a side view of a bristle-inserting mechanism for a brush-making apparatus.
Figure 1B:
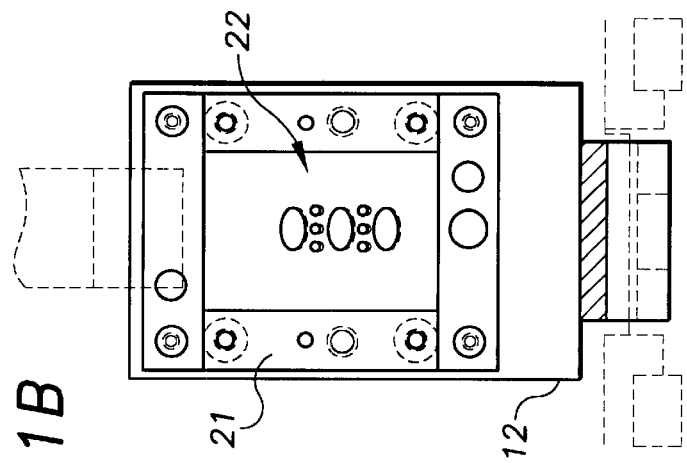
FIG. 1B is a top view of a magazine for a brush-making apparatus.
Figure 2:
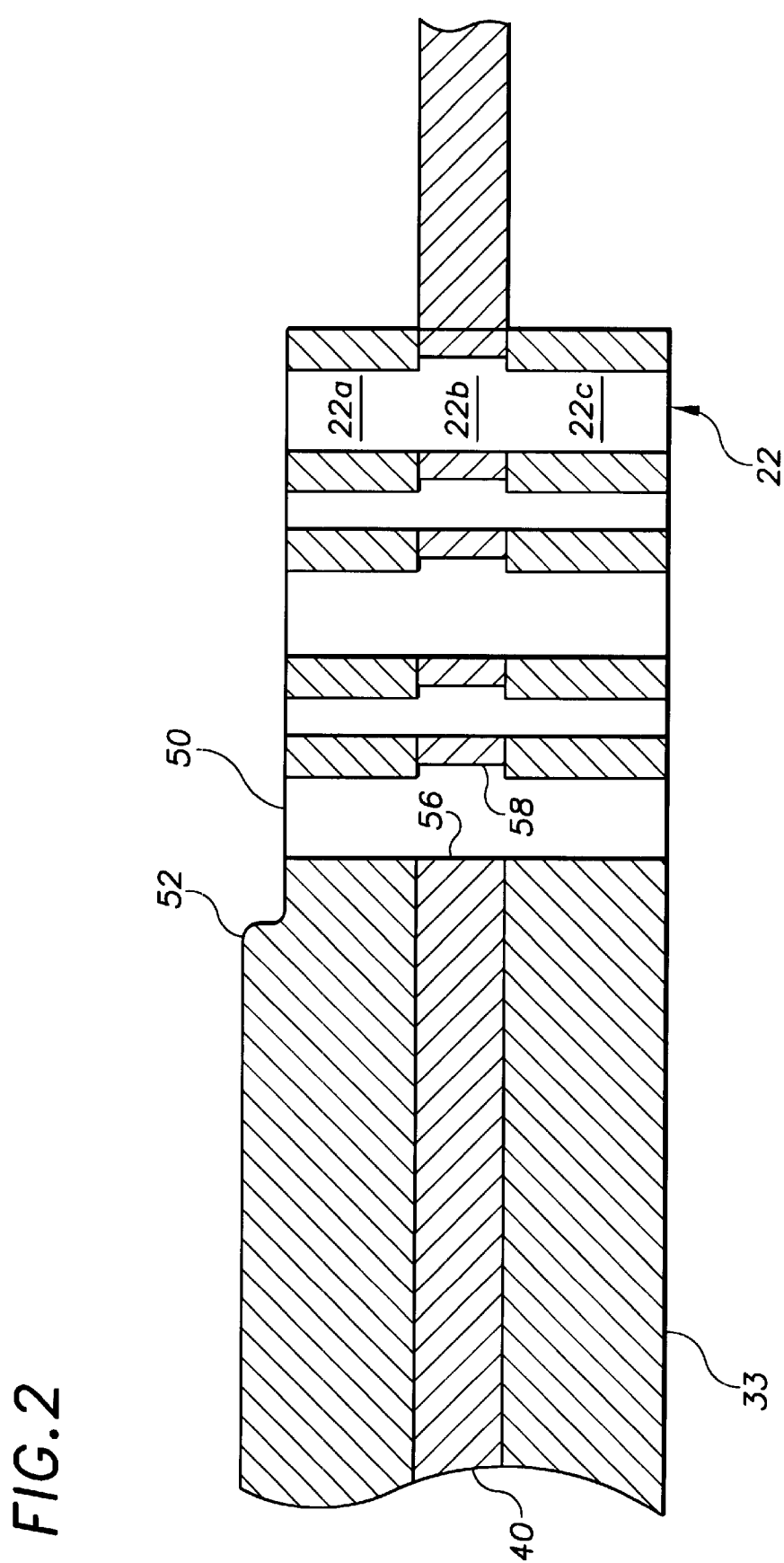
FIG. 2 is a cross-sectional view of the magazine.

In a preferred embodiment of a tuft-loading apparatus 10, the bristle bundle material is fed from an endless supply, for example, a creel system, through channels 14a, 16a, and 18a in a fixed clamp 14, moving clamp 16, and feedblock 18 before optionally passing into a set of transition plates 24 (FIG. 1). From the transition plates 24, the bristle material passes into magazine 12 through channels 22 defined by channels 22a and 22c (FIG. 2). In an alternative embodiment, the bristles may be inserted into the magazine 12 from hanks or other arrangements of pre-cut bristles. Depending on the desired configuration of the bristle bundles in the final product and how they are united with the handle, the length of the bristle bundles may be longer or shorter than (or the same as) the thickness of the magazine. In addition to the bristle bundles, an insert such as a metal shank, plastic insert, or other non-bristle object may be inserted into the magazine and incorporated into the brush. A knife 31 passes between the last transition plate 24 and the magazine 12 along a cut plate 33 opposite face 21 of magazine 12 to separate the bristle bundles from the endless supply. Alternatively, cut plate 33 may be a component of the last transition plate. The magazine 12 carries the bristle bundles 32 through the remainder of the brush-making apparatus. The operation of the transition plates is described in our co-pending application Ser. No. 09/495,580, filed Feb. 1, 2000, now U.S. Pat. No. 6,485,105, the entire contents of which are incorporated herein by reference.

Figure 3:
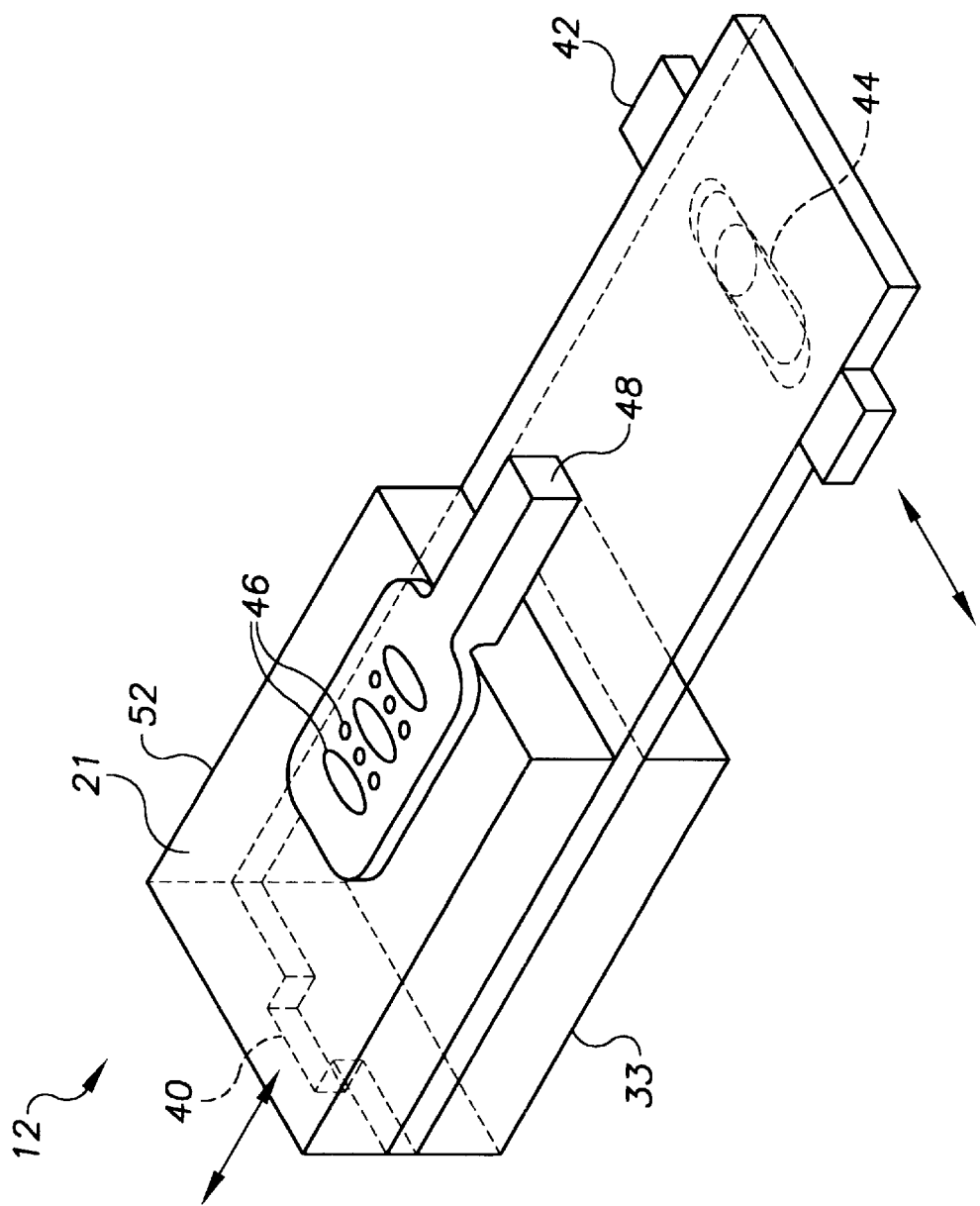
FIG. 3 is an elevational view of a magazine for a brush-making apparatus.
Figure 4:
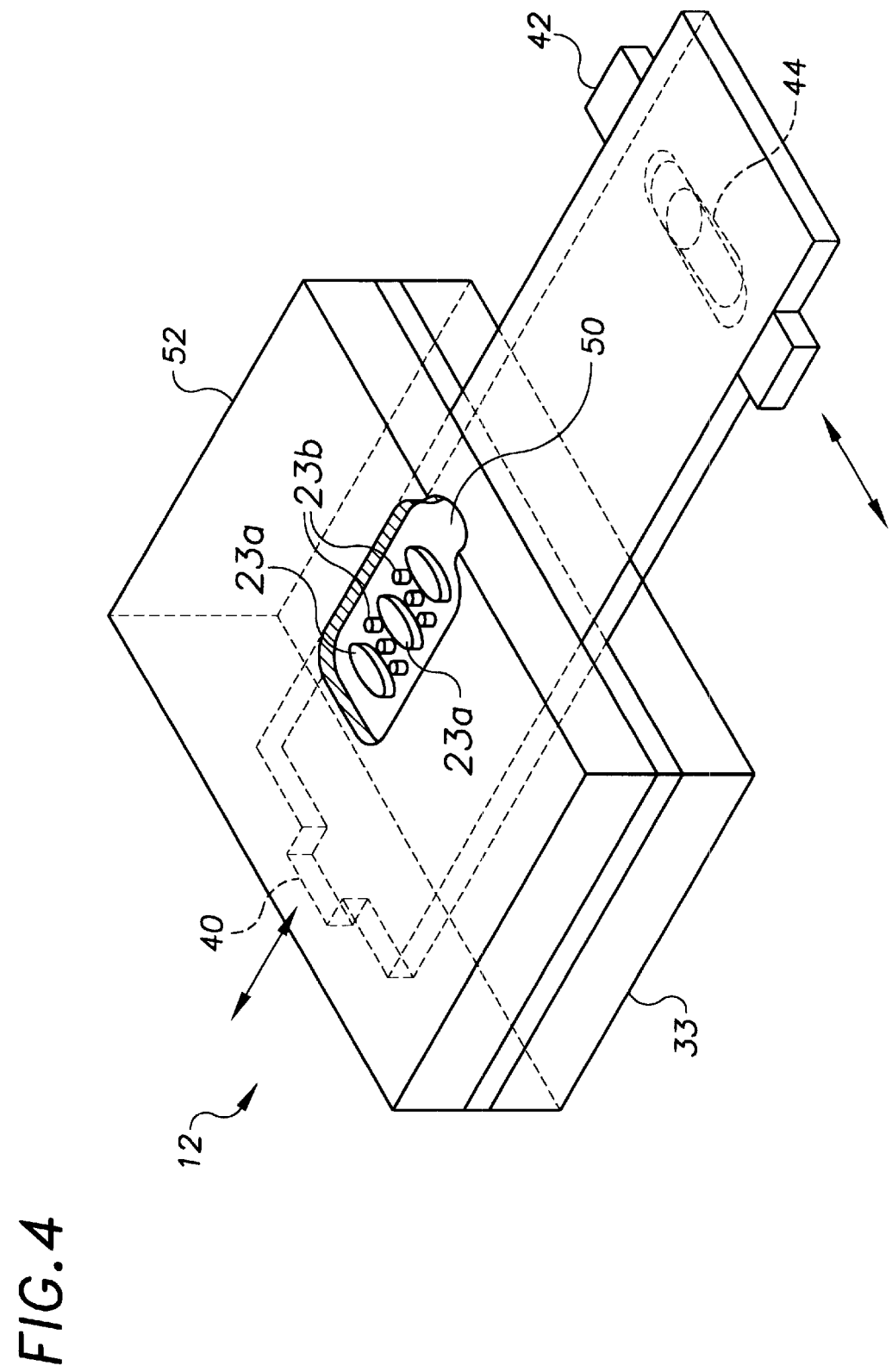
FIG. 4 depicts the magazine shown in FIG. 3 with bristle bundles inserted into channels.
Figure 5:
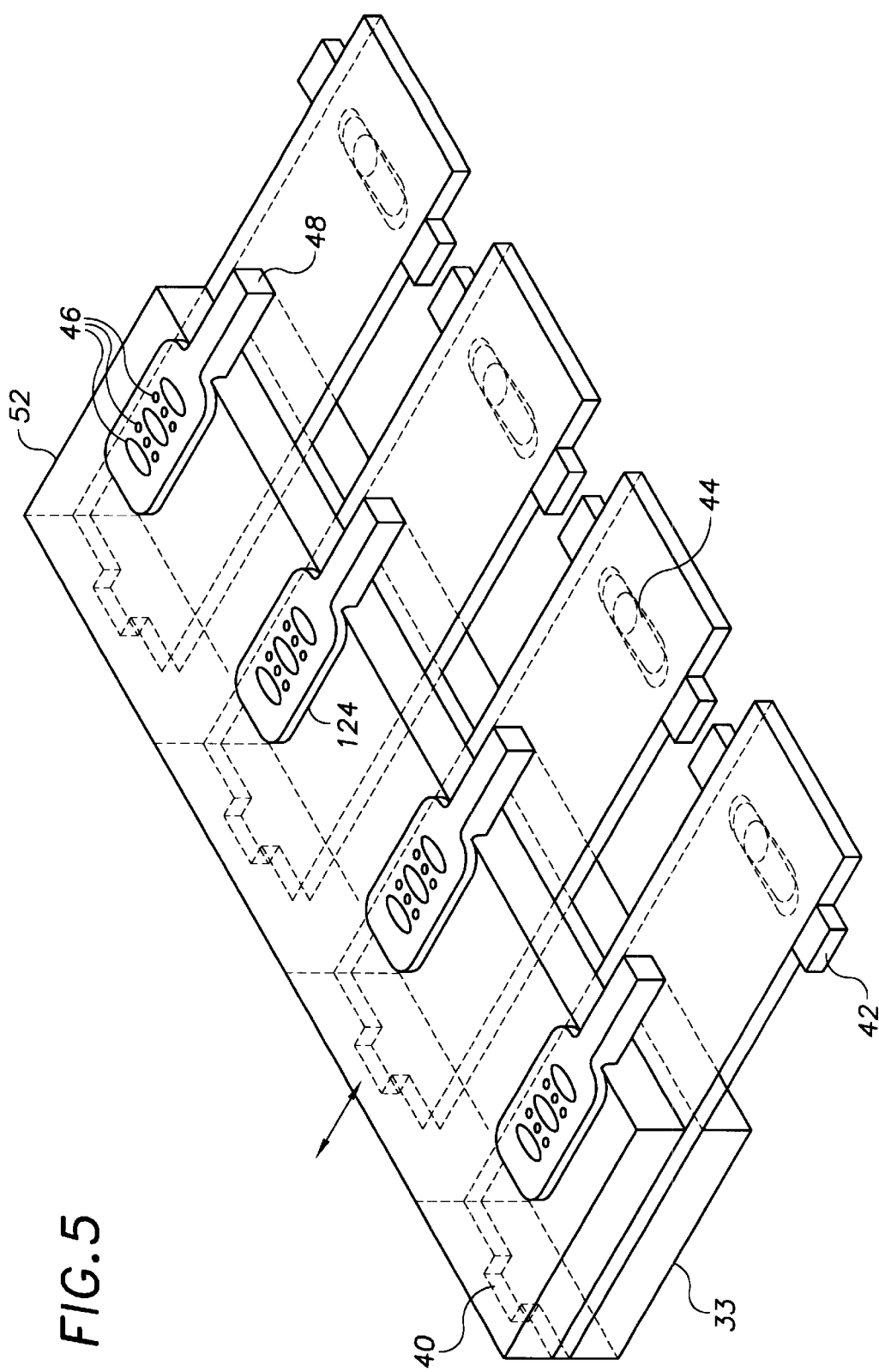
FIG. 5 is an elevational view of a magazine which can hold up to four toothbrushes at a time, in which trim plates have been fitted to the magazine.

FIG. 2 shows a cross-section of the magazine 12, including a locking plate 40, which is shown projecting from the magazine 12. In the embodiment shown, the bristle bundles and channels 22 are perpendicular to the face 21 of magazine 12; however, they may be oriented at an angle up to 45°. The locking plate includes a sliding switch 42 which moves a sliding cam action 44 (FIG. 3). The sliding cam action 44 shifts locking plate 40 between an engaged and a disengaged position when moved by sliding switch 42. The locking plate 40 includes channels 22b that, when the locking plate 40 is in a disengaged position, partially coincide with channels 22 which run through the magazine 12 (FIG. 2). The bristle bundles penetrate through the channels 22 into channels 46 in trim plate 48, which cooperates with a mold cavity portion 50 cut into a mold side 52 of magazine 12 in the magazine (FIG. 3). FIG. 4 shows the ends of bristle bundles 23 protruding into mold cavity portion 50 in magazine 12. Channels 46 (FIG. 3) coincide with the channels 22 through the magazine 12. When locking plate 40 is engaged, the channels 22b in locking plate 40 are offset from channels 22 and clamp the bristle bundles 23 in place. The locking plate 40 can be disengaged and re-engaged to allow the bristle bundles 23 to be moved within the channels 22 or released from the magazine 12. Because the bristle bundles for each toothbrush are supported by an individual clamp mechanism, the apparatus of the invention can be operated with magazines that hold any number of toothbrushes from one to four, five, six, or even more. The embodiment of the magazine shown in FIG. 5 is adapted for production of up to four toothbrushes. Because each brush holding unit 54, depicted in part by switch 42 and locking plate 40, has an individual clamping mechanism, the bristle bundles can be inserted and manipulated for each brush individually.

Because bristle bundles 23a are larger than bristle bundles 23b, when the locking plate 40 is engaged, if the offset of the channels 22b in the locking plate is the same for each channel, then the force on the bristle bundles 23a and 23b will not be the same. For a given displacement of the locking plate 40, the force may be sufficient to retain larger bristle bundles 23a but great enough to damage the bristles in bundles 23b. Thus, in a preferred embodiment, the offset of the channels 22b is adjusted for each size and shape bristle bundle such that the force exerted on each bristle bundle when the locking plate is engaged is the same. In an exemplary embodiment, the force is at least 3, 5, or 8 pounds, preferably at least 12 lbs. However, the force may be as low as a half pound. Forces greater than 18–20 lbs. should be employed with care, as they may deform the filaments in the bristle bundle.

Figure 6A:
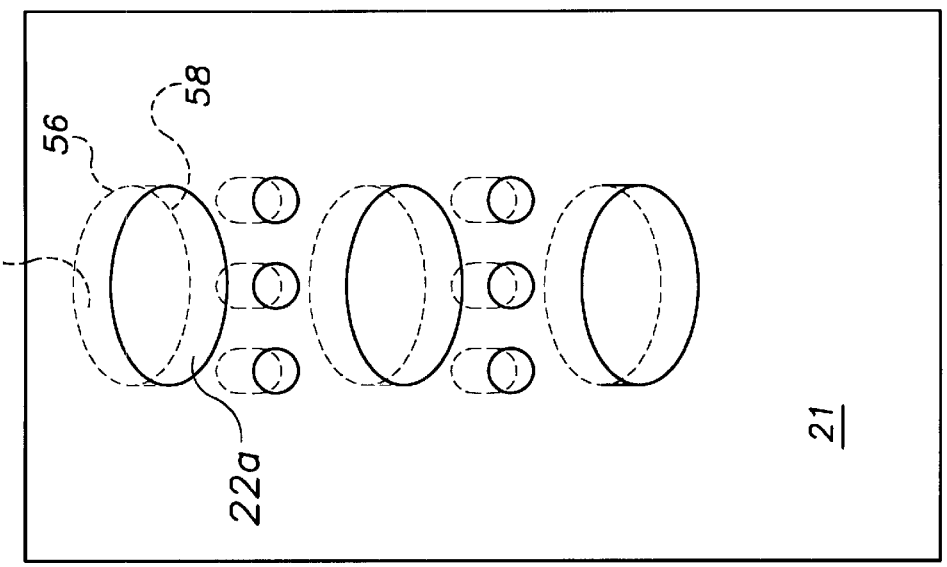
FIG. 6A is a top view of the magazine, showing channels in an underlying locking plate in a disengaged position in outline view.
Figure 6B:
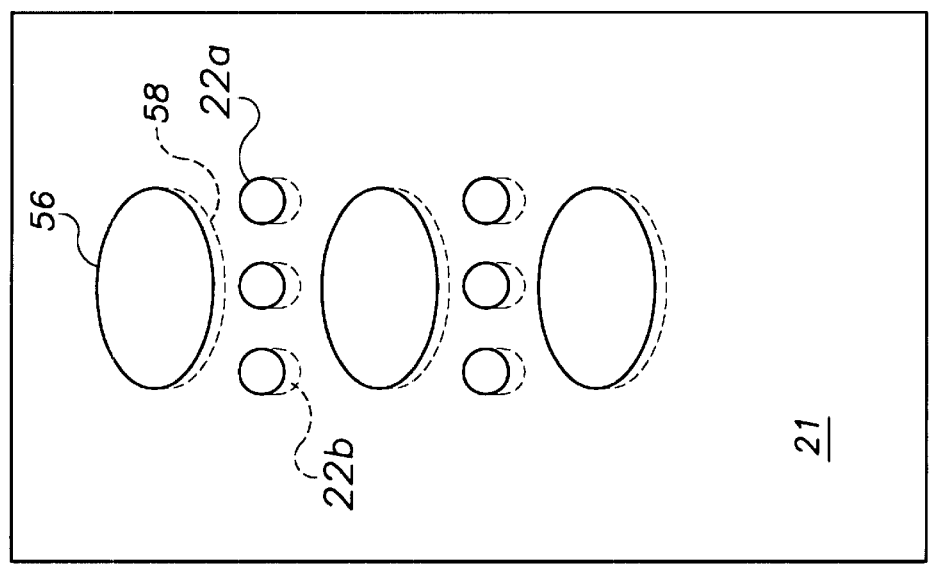
FIG. 6B shows the magazine depicted in FIG. 6A with the locking plate engaged.

To achieve equal force, the size and shape of channels 22b are adjusted to achieve the desired offset when the locking plate 40 is engaged. For example, when the locking plate 40 is moved, it defines a leading side 56 and a trailing side 58 of hole 22b. When the locking plate is disengaged, the leading side 56 coincides with the sides of channels 22a and 22c. However, the trailing side 58 of hole 22b is trimmed so that, when the locking plate is disengaged, it does not coincide with the sides of channels 22a and 22c; instead, channel 22b has a slightly larger cross-sectional area than channels 22a and 22c (FIG. 6A). When locking plate 40 is engaged, the offset for channels 22b varies depending on the size of the bristle bundle 23, even though the leading sides 56 of each channel 22b have moved the same distance with respect to holes 22a and 22c (FIG. 6B).

One method of determining the required size and shape of channels 22b is to test each type of bristle bundle individually. Bristle bundles may vary by size, shape, bristle material, and orientation with respect to the brushhead. In one embodiment, all the bristle bundles of one type were loaded into a magazine in which all the channels were the same size and shape and clamped into place. The offset of the trailing side 58 with respect to channels 22a and 22c to achieve a specific force, for example, 12 lbs., was measured. Because the locking plate cannot be displaced by a different amount for each bristle bundle type when all the bristle bundle are in the channels 22, the size of the channels 22b in the locking plate were adjusted by removing material from trailing side 58 with respect to the sides of channels 22a so that when the locking plate was engaged, the trailing side 58 of each channel 22b was offset by the proper amount. Only the trailing side 58 of the channel needs to be modified because the leading side does not exert a force on the bristle bundle. In addition, it may be desirable to change the shape of channel 22b; for example, for a circular bristle bundle, the trailing side 58 might define a flatter curve than the bristle bundle itself. In another embodiment, channels in the fixed clamp 14, moving clamp 16, and the clamp in feedblock 18 may also be adjusted according to the methods of the invention such that they impart a uniform force on all the uncut bristle bundle material which is fed through them.

In addition, the leading side of channel 22b may have a chamfer to ease passage of the bristle bundles through the magazine as they are initially fed in from the supply. Such a chamfer is also preferred for other elements of apparatus 10 through which bristle bundle material is fed, such as the transition plates 24. The bristle bundles do not interact with the trailing side 58 as they are being fed through the channels 22; however, this does not preclude use of a chamfer on both sides of channel 22b. It is preferable that channels 22a and 22c be chamfered.

After the bristle bundles are fed into the magazine from tuft-loading apparatus 10 or an alternative bristle supply, the magazine transports the bristle bundles along an apparatus having several stations. At some of these stations, the bristles themselves are processed. A variety of processing steps are well known to those skilled in the art; exemplary processing methods of performing them are included in the patents and applications incorporated herein by reference. It will be evident to one skilled in the art that such processing steps exert varying amounts of force on the bristle bundles in the magazine. The force the magazine and the other clamps of the apparatus 10 must exert on the bristle bundles is determined by the force exerted in the various processing steps. For example, in one embodiment, the relative heights of the various bristle bundles might be adjusted, or additional bristle strands might be added to individual bristle bundles. Before the bristle bundles are united with the brushhead, it is preferable to fuse the end of the bristles. The ends of the bristle bundles are heated until the bristle material can flow, shortening and locally thickening the bristle bundles to form a fuse-ball, or fuse.

In a preferred embodiment, the bristle bundles are polished, or end-rounded, by abrading them with a rotating disk. Such a disk displaces the ends of the bristle bundles, exerting a force which has a component along the axis of the bristle bundle and which must be exceeded by the clamp if the bristles are not to fall out of the magazine. A force of between b 3and 18–20 lbs., preferably 5, 8, or 12, is recommended to prevent individual filaments from being pulled from the bristle bundles during end-rounding. The exact force required depends on the bristle material and the bristle bundle diameter. A portion of the bristle bundles may be polished with abrasive pins mounted on a rotating disk. Such pins can be configured to only end-round selected bristle bundles and are described in our concurrently filed patent application entitled "Method and Apparatus for End-Rounding Bristles," the entire contents of which are incorporated by reference herein.

The clamp must also counter the force of the blades which trim the bristle bundle material after profiling and as it is separated from the endless supply. Indeed, the forces required of the fixed clamp 14, moving clamp 16, the clamp in feedblock 18, and locking plate 40 to retain the bristles may not be equal, and the degree of offset can be tailored to the specific part of the apparatus. For example, the fixed clamp 14, moving clamp 16, and the clamp in feedblock 18 must each counter the force exerted by the individual spools on the creel system, which may range between 0.5 lbs. and 1 lb. per skein of bristle bundle material. For example, if a bristle bundle is composed of more than one skein, then the force from the clamp should be some multiple of the force exerted by the creel. However, larger bristle bundles such as bristle bundle 23a may incorporate material from several spools, which may then exert a total force of several pounds.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A magazine for a plurality of bristle bundles, comprising:
    a backplate;
    a mold plate;
    a locking plate disposed between the mold plate and the backplate;
    a plurality of channels extending through the .backplate, mold plate, and locking plate, wherein each channel comprises first, second, and third holes in each of the backplate, locking plate, and mold plate, respectively; and
    a sliding cam action slidably disposed within the locking plate, wherein the locking plate retains the bristle bundles in the plurality of channels when the sliding cam action is in a first position and releases the bristle bundles when the sliding cam action is in a second position,
    wherein the first and third holes in each channel have a cross-section the same shape and size as a cross-section of the bristle bundles designated to be contained therein, and
    at least a portion of the channels incorporate a second hole having a larger cross-sectional area than the cross-section of the bristle bundles designated to be contained therein.

2. The magazine of claim 1, wherein the plurality of second holes in the locking plate are adapted and constructed such that the locking plate exerts the same force on all of the bristle bundles in the magazine when the sliding cam action is in the first position.

3. The magazine of claim 1, wherein the first, second, and third holes in each channel comprise a leading side and a trailing side, wherein the trailing side of at least a portion of the second holes of the channels is not aligned with the trailing sides of the corresponding first and third holes for each channel when the sliding cam action is in the first position and wherein an extent of the misalignment is adjusted such that a force exerted on each of the bristle bundles when the sliding cam action is in the first position is equal.

4. The magazine of claim 3, wherein the extent of the misalignment is not equal for all of the channels.

5. The magazine of claim 3, wherein the force exerted on each of the bristle bundles when the sliding cam action is in the first position is greater than 0.5 lbs.

6. The magazine of claim 5, wherein the force exerted on each of the bristle bundles is greater than 3 pounds.

7. The magazine of claim 6, wherein the force exerted on each of the bristle bundles is greater than 5 pounds.

8. The magazine of claim 7, wherein the force exerted on each of the bristle bundles is greater than 8 pounds.

9. The magazine of claim 8, wherein the force exerted on each of the bristle bundles is greater than 12 pounds.

10. The magazine of claim 9, wherein the force exerted on each of the bristle bundles is greater than 18 pounds.

11. An improved magazine for transporting bristle bundles having a backplate, a mold plate, a locking plate disposed between the mold plate and the backplate, a plurality of channels traversing the magazine, each channel comprising collinear first, second, and third holes in each of the backplate, locking plate, and mold plate, respectively, and a sliding cam action slidably disposed within the locking plate, wherein the locking plate retains the bristle bundles in the channels when the sliding cam action is in a first position and releases the bristle bundles when the sliding cam action is in a second position, wherein the improvement comprises that the size of each of the second holes is adapted and constructed such that the locking plate exerts a consistent force across each bristle bundle when the sliding cam action is in the first position.

* * * * *